(12) United States Patent
Sommers

(10) Patent No.: US 11,474,823 B2
(45) Date of Patent: Oct. 18, 2022

(54) METHODS, SYSTEMS, AND COMPUTER READABLE MEDIA FOR ON-DEMAND, ON-DEVICE COMPILING AND USE OF PROGRAMMABLE PIPELINE DEVICE PROFILES

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/321,336

(22) Filed: May 14, 2021

(65) Prior Publication Data

US 2021/0389954 A1 Dec. 16, 2021

Related U.S. Application Data

(60) Provisional application No. 63/039,433, filed on Jun. 15, 2020.

(51) Int. Cl.
*G06F 8/41* (2018.01)
*G06F 9/38* (2018.01)
(Continued)

(52) U.S. Cl.
CPC .............. *G06F 9/3867* (2013.01); *G06F 8/41* (2013.01); *G06F 9/30079* (2013.01); *G06F 16/9017* (2019.01)

(58) Field of Classification Search
CPC ....... G06F 8/41; G06F 9/3867; G06F 9/30079
See application file for complete search history.

(56) References Cited

U.S. PATENT DOCUMENTS 7,272,822 B1 9/2007 Riggins et al.
8,028,276 B1 9/2011 Bessonov
(Continued)

FOREIGN PATENT DOCUMENTS

CN 107749802 A 3/2018
CN 110719212 A 1/2020
DE 102020114730 A1 12/2020

OTHER PUBLICATIONS

Miguel Neves et al., Dynamic Property Enforcement in Programmable Data Planes, IEEE Mar. 31, 2021, retrieved online on Jun. 2, 2022, pp. 1540-1552. Retrieved from the Internet: <URL: https://ieeexplore.IEEE.org/stamp/stamp.jsp?tp=&arnumber=9393490>. (Year: 2021).*

(Continued)

*Primary Examiner* — Hanh Thi-Minh Bui

(57) ABSTRACT

A method for on-demand, on-device compiling and use of programmable pipeline device profiles includes storing, on a network test or visibility device, programmable pipeline device source code and a plurality of different programmable pipeline device profile definitions containing parameters for implementing different programmable pipeline device profile variations. The method further include implementing, on the network test or visibility device, a compiler that receives the programmable pipeline device source code and one of the profile definitions as input and that produces as output a programmable pipeline device profile including compiled object code for configuring a programmable pipeline device to implement a network test or network visibility function. The method further includes invoking the compiler to compile, using one of the profile definitions, the programmable pipeline device source code into a programmable pipeline device profile for implementing a network test or visibility function and loading the profile on the network test (Continued)

or visibility device to configure the programmable pipeline device for implementing the network test or network visibility function.

19 Claims, 4 Drawing Sheets

(51) Int. Cl.
  *G06F 16/901* (2019.01)
  *G06F 9/30* (2018.01)

(56) References Cited

U.S. PATENT DOCUMENTS

| | | | |
|---|---|---|---|
| 8,402,435 | B1 | 3/2013 | Spiro |
| 9,063,815 | B2 | 6/2015 | Kundu et al. |
| 9,582,620 | B1 | 2/2017 | Segal et al. |
| 9,747,084 | B2 | 8/2017 | Hall |
| 9,891,898 | B1 | 2/2018 | Tonsing |
| 10,002,247 | B2 | 6/2018 | Suarez et al. |
| 10,164,829 | B1 | 12/2018 | Watson et al. |
| 10,225,381 | B1 | 3/2019 | Bosshart |
| 10,303,796 | B2 | 5/2019 | Gangadharappa et al. |
| 10,324,436 | B2 | 6/2019 | Oliverio et al. |
| 10,394,991 | B2 | 8/2019 | Phoon et al. |
| 10,587,491 | B1 | 3/2020 | Volpe |
| 10,733,088 | B1 | 8/2020 | Sommers |
| 10,868,730 | B2 | 12/2020 | Mozumdar et al. |
| 10,880,197 | B2 | 12/2020 | Naskar et al. |
| 10,915,437 | B1* | 2/2021 | Arguelles ............ G06F 11/3688 |
| 11,032,151 | B1 | 6/2021 | Sommers |
| 11,093,376 | B2 | 8/2021 | Sommers et al. |
| 11,301,362 | B1* | 4/2022 | John .................. G06F 11/3692 |
| 2004/0158602 | A1 | 8/2004 | Broberg |
| 2006/0168205 | A1 | 7/2006 | Barron et al. |
| 2006/0259629 | A1 | 11/2006 | Usmani et al. |
| 2009/0112505 | A1 | 4/2009 | Engel et al. |
| 2011/0145649 | A1 | 6/2011 | Nilsson et al. |
| 2011/0183613 | A1 | 7/2011 | Nocera |
| 2012/0033678 | A1 | 2/2012 | Page et al. |
| 2013/0152047 | A1 | 6/2013 | Moorthi et al. |
| 2014/0157245 | A1 | 6/2014 | Krueger |
| 2015/0088827 | A1 | 3/2015 | Xu et al. |
| 2015/0172208 | A1 | 6/2015 | DeCusatis et al. |
| 2015/0234725 | A1 | 8/2015 | Cillis et al. |
| 2015/0365325 | A1 | 12/2015 | Hwang et al. |
| 2016/0234087 | A1 | 8/2016 | Nyerges et al. |
| 2017/0093986 | A1 | 3/2017 | Kim et al. |
| 2017/0237632 | A1 | 8/2017 | Hegde et al. |
| 2017/0322873 | A1 | 11/2017 | Morris |
| 2018/0137139 | A1 | 5/2018 | Bangalore et al. |
| 2018/0210823 | A1 | 7/2018 | Vorganti |
| 2018/0255027 | A1 | 9/2018 | Winig et al. |
| 2018/0316608 | A1 | 11/2018 | Dowlatkhah et al. |
| 2019/0014395 | A1 | 1/2019 | Anand et al. |
| 2019/0065349 | A1 | 2/2019 | Sharma et al. |
| 2019/0199654 | A1 | 6/2019 | Pope et al. |
| 2019/0222481 | A1 | 7/2019 | Hira |
| 2019/0379588 | A1 | 12/2019 | Rao |
| 2019/0384580 | A1 | 12/2019 | Martini et al. |
| 2020/0021512 | A1 | 1/2020 | Naskar et al. |
| 2020/0267059 | A1 | 8/2020 | Mozumdar et al. |
| 2020/0401504 | A1 | 12/2020 | Sommers et al. |

OTHER PUBLICATIONS

Notice of Allowance and Fee(s) Due for U.S. Appl. No. 17/220,617 (dated Apr. 13, 2022).
Song et al., "Dynamic Network Probes: A Stepping Stone to Omni Network Visibility," arXiv:1612.02862v1, pp. 1-7 (Dec. 8, 2016).
Applicant-Initiated Interview Summary for U.S. Appl. No. 16/446,318 (dated May 26, 2021).
Notice of Allowance and Fee(s) Due for U.S. Appl. No. 16/446,318 (dated May 26, 2021).
Combined Search and Examination Report under Sections 17 & 18(3) for Great Britain Application Serial No. GB2009118.7 (dated Mar. 8, 2021).
Notice of Allowance and Fee(s) Due for U.S. Appl. No. 16/269,498 (dated Mar. 8, 2021).
Non-Final Office Action for U.S. Appl. No. 16/446,318 (dated Feb. 4, 2021).
Non-Final Office Action for U.S. Appl. No. 16/269,498 (dated Nov. 17, 2020).
Notice of Allowance and Fee(s) Due for U.S. Appl. No. 16/869,129 (dated Sep. 28, 2020).
Notice of Allowance and Fee(s) Due for U.S. Appl. No. 16/035,534 (dated Aug. 27, 2020).
Advisory Action and AFCP 2.0 Decision for U.S. Appl. No. 16/269,498 (dated Jul. 27, 2020).
Final Office Action for U.S. Appl. No. 16/269,498 (dated May 8, 2020).
Commonly-Assigned, co-pending U.S. Appl. No. 16/869,129 for "Methods, Systems, and Computer Readable Media for Testing Network Elements of an In-Band Network Telemetry Capable Network," (Unpublished, filed May 7, 2020).
Notice of Allowance and Fee(s) Due for U.S. Appl. No. 17/001,614 (dated Sep. 29, 2021).
Commonly-assigned, co-pending U.S. Appl. No. 17/460,146 for "Methods, Systems and Computer Readable Media for Improving Remote Direct Memory Access Performance," (Unpublished, filed Aug. 27, 2021).
Applicant-Initiated Interview Summary for U.S. Appl. No. 16/446,318 (dated May 28, 2021).
Non-Final Office Action for U.S. Appl. No. 16/869,129 (dated Nov. 17, 2020).
Final Office Action for U.S. Appl. No. 16/869,129 (dated May 8, 2020).
Notice of Allowance and Fee(s) Due for U.S. Appl. No. 16/290,426 (dated May 7, 2020).
Non-Final Office Action for U.S. Appl. No. 16/181,309 (dated Apr. 13, 2020).
Notice of Allowance and Fee(s) Due for U.S. Appl. No. 16/181,309 (dated Mar. 19, 2020).
Notice of Allowance and Fee(s) Due for U.S. Appl. No. 16/290,426 (dated Mar. 18, 2020).
Non-Final Office Action for U.S. Appl. No. 16/269,498 (dated Jan. 28, 2020).
Sommers, "P4 Data Plane Profile Reconciliation," ip.com, pp. 1-5 (2020).
Sommers, "Multiple Data Plane Profiles Digest and Catalog Definition and Selection," ip.com, pp. 1-5 (2020).
Sommers, "P4 Profile Generation Based on Prospective Device Configuration," ip.com, pp. 1-9 (2020).
Sommers, "Composable/Scalable Data Plane Based on Initial Compiler Input Parameters," ip.com, pp. 1-8 (2020).
Johansson et al., "Dynamic Configuration of Packet Deduplication Engine in Tofino," ip.com, pp. 1-6 (2020).
Non-Final Office Action for U.S. Appl. No. 16/181,309 (dated Oct. 28, 2019).
Sommers et al., "Dynamic Test-Based P4 Packet Blaster Hardware Configuration ED—Darl Kuhn," IP.com, pp. 1-5 (2019).
Commonly-assigned, co-pending U.S. Appl. No. 16/290,426 for "Methods, Systems, and Computer Readable Media for Configuring a Test System Using Source Code of a Device Being Tested," (Unpublished, filed Jun. 19, 2019).
Commonly-assigned, co-pending U.S. Appl. No. 16/290,426 for "Methods, Systems, and Computer Readable Media for Testing a Network Node or a Related Application Programming Interface Using Source Code Metadata," (Unpublished, filed Mar. 1, 2019).
Zhang et al., "HyperVDP: High-Performance Virtualization of the Programmable Data Plane," IEEE Journal on Selected Areas in Communications, vol. 37, No. 3, pp. 556-569 (Mar. 2019).
Commonly-assigned, co-pending U.S. Appl. No. 16/269,498 for "Methods, Systems, and Computer Readable Media for Providing Dynamically Configurable, Distributed Network Visibility Device," (Unpublished, filed Feb. 6, 2019).

(56) References Cited

OTHER PUBLICATIONS

"Dynamic Test-Based P4 Packet Blaster Hardware Configuration," IPCOM000257013D, pp. 1-6 (Jan. 10, 2019).
"The World's Fastest & Most Programmable Networks," Barefoot Networks, https://barefootnetworks.com/resources/worlds-fastest-most-programmable-networks/, pp. 1-10 (Feb. 6, 2019).
"P4Runtime Specification," The P4.org API Working Group, Version 1.0.0, pp. 1-97 (Jan. 29, 2019).
"P4Runtime Specification," The P4.org API Working Group, Version 1.0.0-rc4, pp. 1-72 (Jan. 25, 2019).
"Cubro Sessionmaster EXA48600," Cubro Network Visibility, pp. 1-5 (2019).
"p4lang / switch," https://github.com/p4lang/switch, pp. 1-4 (Copyright 2019).
"Sparkline," Wikipedia, https://en.wikipedia.org/wiki/Sparkline, pp. 1-3 (2019).
Hill et al., "Tracking Network Flows with P4," University of Amsterdam, System and Network Engineering, pp. 1-16 (2018).
Sommers et al., "Dynamic Test-Based P4 Packet Blaser Hardware Configuration," ip.com, pp. 1-5 (2018).
Commonly-Assigned, co-pending U.S. Appl. No. 16/181,309 for "Methods, Systems, and Computer Readable Media for Testing Network Elements of an In-Band Network Telemetry Capable Network," (Unpublished, filed Nov. 5, 2018).
Rodriguez et al., "BB-Gen: A Packet Crafter for P4 Target Evaluation", SIGCOMM Posters and Demos '18, pp. 1-3 (Aug. 20-25, 2018).
Commonly-Assigned, co-pending U.S. Appl. No. 16/035,534 for "Methods, Systems, and Computer Readable Media for Testing a Network Node Using Source Code," (Unpublished, filed Jul. 13, 2018).
Saha et al., "Fault Detection Effectiveness of Source Test Case Generation Strategies for Metamorphic Testing," MET, arXiv:1802.07361v1, pp. 1-8 (Feb. 20, 2018).
Nötzli, "p4pktgen: Automated Test Case Generation for P4 Programs," SOSR '18, pp. 1-7 (Mar. 28-29, 2018).
Anand et al., "POINT: An Intent-driven Framework for Integrated Packet-Optical In-band Network Telemetry," Infinera Corporation, pp. 1-6 (2018).
Liang et al., "In-band Network Function Telemetry," Tsinghua University, pp. 1-3 (Aug. 20-25, 2018).
Iša et al., "Verification of Generated RTL from P4 Source Code," 2018 IEEE 26th International Conference on Network Protocols, pp. 1-2 (2018).
"Test Case Management for Improved QA," Perforce, pp. 1-13 (2018).
"Cubro's network packet broker evolution," Cubro Blog, pp. 1-3 (Jan. 15, 2018).
McKeown et al., "P4 Runtime—Putting the Control Plane in Charge of the Forwarding Plane," The P4 Language Consortium, pp. 1-6 (Dec. 4, 2017).
P4 (programming language), Wikipedia, https://en.wikipedia.org/w/index/php?title=P4_(programming_language)&oldid=812348591, pp. 1-3 (Nov. 27, 2017).
Notice of Allowance and Fee(s) Due for U.S. Appl. No. 17/220,617 (dated Feb. 10, 2022).

\* cited by examiner

METHODS, SYSTEMS, AND COMPUTER READABLE MEDIA FOR ON-DEMAND, ON-DEVICE COMPILING AND USE OF PROGRAMMABLE PIPELINE DEVICE PROFILES

RELATED APPLICATIONS

This application claims the priority benefit of U.S. Provisional Patent Application Ser. No. 63/039,433, filed Jun. 15, 2020, the disclosure of which is incorporated herein by reference in its entirety.

TECHNICAL FIELD

The subject matter described herein relates to programmable pipeline devices. More particularly, the subject matter described herein relates to methods, systems, and computer readable media for on-demand, on-device compiling and use of programmable pipeline device profiles.

BACKGROUND

Hardware switching application specific integrated circuits (ASICs), both fixed and programmable, can have multiple build or configuration profiles, each of which determines a range of capabilities and features. Fixed pipeline devices are configurable (e.g. via register programming) to allow different arrangement of resources. For example, a programmable switching ASIC might have numerous ternary content addressable memory (TCAM) tiles which can be arranged into different 2D arrays to effect wider match keys (number of TCAM match bits) or deeper tables (number of table rows). Various on-chip resources are configurable to permit feature and capacity tradeoffs using a fixed pool of resources. These devices usually have fixed-function blocks as well, e.g. L2 or L3 lookup tables. The number of configurable permutations on these devices is large but somewhat constrained by the fixed nature of the pipelines. Each such configuration profile takes a relatively small amount of compute resources in the form of control software, disk files, etc. There is usually no requirement to compile the designs since the architecture is fixed-function. All configuration is done at run-time.

Programmable pipeline devices (e.g. Barefoot/Intel Tofino, Broadcom Trident4, Mellanox Spectrum II/III) have even finer-grained resource pools and extremely flexible pipeline configurations. A P4 or NPL program is compiled, and the output (object code and other artifacts) is loaded onto the device to configure the on chip resources and thereby execute the user's dataplane program. With this approach a nearly infinite range of solutions in the form of build profiles is possible. Each profile may require separate, time-consuming compilation, and the resulting output artifacts take appreciable space in the form of disk files. Using a program template with parameter inputs to generate program variations reduces the labor required to generate program variations over an approach where each program variation is manually created. However, even using a template-based program variation generation approach will result in a number of program variations that can exceed the storage capacity of a device. In addition, locating the program variation that matches a particular use case may be difficult.

There may be instances in which a network test or visibility device that incorporates a programmable pipeline device is not connected to a public network, such as the Internet. For example, a network test or visibility device may not be connected to the Internet for security reasons or the connection may be lost due to a network failure. In such instances, the network test or visibility device may not have access to an on-line source of programmable pipeline device profiles for desired use cases. This problem coupled with the problem of limited storage for compiled profile object code on the network test or visibility device can lead to the inability to configure the programmable pipeline device to implement a desired network test or visibility function until a network connection is available.

The inputs to a programmable pipeline device configuration compiler are 1) source code and 2) a profile definition. The source code describes the programmable pipeline device's behavior and can declare constructs, such as a layer 3 lookup table, and actions to be performed, such as "set the source IP address to (value)." The profile definition includes parameters that specify configuration options for the constructs created in the source code. For example, one profile definition may allocate 2000 entries for an IP version 4 (IPv4) lookup table and 1000 entries for an IP version 6 (IPv6) lookup table, and another profile definition may allocate 1000 entries for the IPv4 lookup table and 2000 entries for the IPv6 lookup table. Each of these profile definitions, when input to the compiler with the corresponding source code, will cause the compiler to output a compiled profile, which includes object code directly executable by a programmable pipeline device to configure the device to implement the desired functionality. The compiler may also output metadata associated with the compiled profile, which describes the function of the profile. Metadata can also be harvested by a separate tool from text embedded in the source code. Metadata can also be manually extracted from the source code. The object code and metadata associated with a compiled profile are also referred to as profile artifacts.

As indicated above, there are a limitless number of possible profiles for programmable pipeline devices, and the devices themselves and the network test or visibility devices in which they reside have limited storage space for storing compiled profiles. In addition, network test or visibility devices may not always have access to online sources of programmable device profiles In light of these and other difficulties, there exists a need for methods, systems, and computer readable media for on-demand, on-device compiling and use of programmable device profiles.

SUMMARY

A method for on-demand, on-device compiling and use of programmable pipeline device profiles includes storing, on a network test or visibility device, programmable pipeline device source code and a plurality of different programmable pipeline device profile definitions containing parameters for implementing different programmable pipeline device profile variations. The method further include implementing, on the network test or visibility device, a compiler that receives the programmable pipeline device source code and one of the profile definitions as input and that produces as output a programmable pipeline device profile including compiled object code for configuring a programmable pipeline device to implement a network test or network visibility function. The method further includes invoking the compiler to compile, using one of the profile definitions, the programmable pipeline device source code into a programmable pipeline device profile for implementing a network test or visibility function and loading the profile on the network test or visibility device to configure the programmable pipeline device for implementing the network test or network visibility function.

According to another aspect of the subject matter described herein, storing the programmable pipeline device source code and the different programmable pipeline device profiles on the network test or visibility device includes storing the programmable pipeline device source code and the profile definitions in a file system of the network test or visibility device.

According to another aspect of the subject matter described herein, implementing the compiler on the network test or visibility device includes implementing the compiler on the programmable pipeline device.

According to another aspect of the subject matter described herein, implementing the compiler on the network test or visibility device includes implementing the compiler on a processor separate from the programmable pipeline device.

According to another aspect of the subject matter described herein, implementing the compiler on the network test or visibility device on a chip that includes the programmable pipeline device and at least one additional processor.

According to another aspect of the subject matter described herein, the method for on-demand, on-device compiling of network test or visibility profiles includes providing device configuration software for enabling creation of new programmable pipeline device profile source code and profile definitions to be stored on the network test or visibility device and modification of existing programmable pipeline device profile source code and profile definitions stored on the network test or visibility device.

According to another aspect of the subject matter described herein a method for on-demand, on-device compiling of programmable pipeline device profiles includes receiving input via the device configuration software to create or modify the programmable pipeline device profile source code or to create or modify one of the profile definitions and wherein invoking the compiler includes invoking the compiler using the input received via the device configuration software.

According to another aspect of the subject matter described herein, a method for on-demand, on-device configuration of programmable pipeline device profiles includes downloading a catalog onto the network test or visibility device, where the catalog describes profiles for configuring the programmable pipeline device, receiving, via the catalog, selection of one of the profiles, and wherein invoking the compiler includes invoking the compiler using programmable pipeline device source code and a profile definition corresponding to the profile selected via the catalog.

According to another aspect of the subject matter described herein, a method for on-demand, on-device compiling of network test or visibility device profiles includes determining, by the compiler, that the programmable pipeline device source code and profile definition received as input will result in a compiled profile that will not fit on network test or visibility device, generating output indicative of a compilation failure, and requesting changes to the programmable pipeline device source code or parameter definition received as input.

According to another aspect of the subject matter described herein, the programmable pipeline device comprises a P4 device, the programmable pipeline device source code comprises P4 source code, and the compiler comprises a P4 compiler.

According to another aspect of the subject matter described herein, a system for on-demand, on-device compiling and use of programmable pipeline device profiles includes a network test or visibility device. The system further includes a programmable pipeline device implemented on the network test or visibility device. The system further includes a programmable pipeline device source code compiler implemented on the network test or visibility device. The network test or visibility device stores programmable pipeline device source code and a plurality of different programmable pipeline device profile definitions containing parameters for implementing different programmable pipeline device profile variations. The compiler receives the programmable pipeline device source code and one of the profile definitions as input and produces as output a programmable pipeline device profile including compiled object code for configuring the programmable pipeline device to implement a network test or network visibility function. The device configuration software invokes the compiler to compile, using one of the profile definitions, the programmable pipeline device source code into a programmable pipeline device profile to implement a network test or visibility function and loads the profile onto the programmable pipeline device to configure the programmable pipeline device for implementing the network test or network visibility function.

According to another aspect of the subject matter described herein, the device configuration software downloads a catalog onto the network test or visibility device, where the catalog describes profiles for configuring the programmable pipeline device, receiving, via the catalog, selection of one of the profiles, and wherein the device configuration software invokes the compiler using programmable pipeline device source code and a profile definition corresponding to the profile selected via the catalog.

According to another aspect of the subject matter described herein, a non-transitory computer readable medium having stored thereon executable instructions that when executed by a processor of a computer control the computer to perform steps is provided. The steps include storing, on a network test or visibility device, programmable pipeline device source code and a plurality of different programmable pipeline device profile definitions containing parameters for implementing different programmable pipeline device profile variations. The steps further include implementing, on the network test or visibility device, a compiler that receives the programmable pipeline device source code and one of the profile definitions as input and that produces as output a programmable pipeline device profile including compiled object code for configuring a programmable pipeline device to implement a network test or network visibility function. The steps further include invoking the compiler to compile, using one of the profile definitions, the programmable pipeline device source code into a programmable pipeline device profile for implementing a network test or visibility function. The steps further include loading the profile on the network test or visibility device to configure the programmable pipeline device for implementing the network test or network visibility function.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for on-demand, on-device compiling and use of programmable pipeline device profiles. The subject matter described herein addresses at least the following problems associated with programmable pipeline device profiles:
 1. How does a user get a new profile on demand which isn't already offered (to satisfy some use-cases which don't fit available profiles)?
 2. How does a user get a new profile on a device when the device lacks network connectivity to an on-line profile source?

Figure 1:
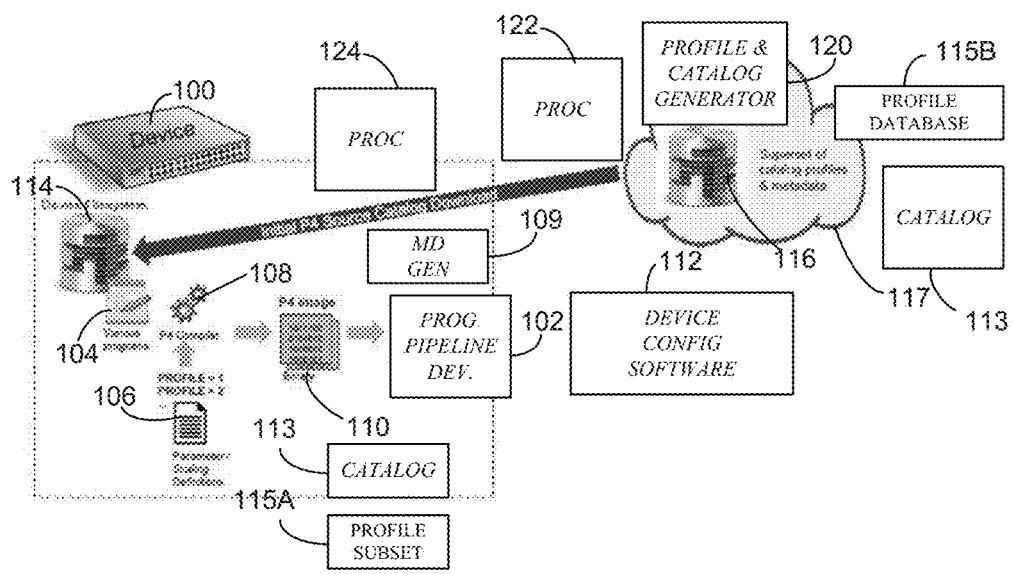
FIG. 1 is a block diagram illustrating an exemplary system for on-demand, on-device compiling and use of programmable pipeline device profiles.

In order to address these problems, the subject matter described herein includes on-demand, on-device compiling and use of programmable pipeline device profiles. FIG. 1 is a block diagram of a system for on-demand, on-device compiling and use of programmable pipeline device profiles. In the example in FIG. 1, the profiles are P4 profiles. However, the subject matter described herein is not limited to the P4 programming language. Any programming language usable to configure a programmable pipeline device is intended to be within the scope of the subject matter described herein.

Referring to FIG. 1, a device 100 may be any suitable device that includes a programmable pipeline device 102. In one example, device 100, may be a network visibility device, such as a network packet broker. In the illustrated example, programmable pipeline device 102 comprises the Tofino™ chip available from Barefoot Networks (now owned by Intel Corporation). However, any programmable pipeline device is intended to be within the scope of the subject matter described herein.

To configure the programmable pipeline device 102, a user writes programs 104 in a source code programming language, such as the P4 programming language. The user or developer also creates profile definitions 106 that specify the configuration parameters for a particular profile. Source code 104 and profile definitions 106 are input to a compiler 108. Compiler 108 outputs programmable device profiles 110 that include object code directly executable by programmable pipeline device 102 to configure programmable pipeline device 102 to implement desired functions. Compiler 108 may also outputs metadata that describes the profile. Alternatively, a metadata generator 109 may generate metadata from text, such as comments included in source code 104.

In the example illustrated in FIG. 1, compiler 108 resides on network test or visibility device 100. As such, if network test or visibility device 100 is disconnected from a network through which online sources of profiles are available, compiler 108 can be invoked on-device to compile new profiles to be implemented on programmable pipeline device 102. Device 100 is only required to store source code 104 and parameter definitions 106, which consume far less storage space than compiled device profiles 110.

The system illustrated in FIG. 1 further includes device configuration software 112 for configuring network test or visibility device 100. To perform such configuration using profiles, device configuration software 112 may invoke compiler 108 to compile, using one of the profile definitions 106, the programmable pipeline device source code 104 into a programmable pipeline device profile 110 to implement a network test or visibility function and load the profile onto programmable pipeline device 102. Device configuration software 112 may reside on device 100, in cloud network 117, or on a computing device separate from device 100 and cloud network 117. In one particular example, device configuration software 112 may be implemented on a cloud resident device that a user can access via a web browser or other suitable client interface to search, select, and load profiles onto device 100. In an alternate implementation in which network security is of primary importance, device configuration software 112 may be implemented on device 100 or on a computing platform in a private computing network connected to device 100.

To make plural profiles accessible to users and orchestration software, a catalog 113 of profile metadata may be provided. In one example, the catalog may represent the entirety of available device profiles (whether stored locally on device 100 or in a separate location, such as a cloud storage device. In the example illustrated in FIG. 1, catalog 113 is stored in a device file system 114 along with profile subset 115A containing object code for profiles for expected use cases of device 100. Device file system 114 may be stored in the storage space of device 100 on which programmable pipeline device 102 resides.

Catalog 113 may also be stored in or on a cloud storage device 116 implemented in cloud network 117. Cloud storage device 116 may also store profile database 115B containing a superset of programmable pipeline device profiles, including compiled object code for each profile. When new profiles are created, catalog 113 and profile database 115B stored in cloud storage device 116 are updated, and catalog and/or profile updates may be downloaded to device 100 periodically or upon request, provided that network connectivity is available with device 100. For example, device 100 or an orchestration interface associated with device 100 may request catalog and/or profile updates from cloud storage device 116. In addition, when a new profile is created and compiled on device 100, device configuration software 112 may upload the profile and associated metadata to profile database 115B.

In addition to invoking compiler 108 to create new device profiles on device, device configuration software 112 may allow a network test or visibility device user to create configurations, search, match, and select profiles, reconcile configurations between profiles, browse an online catalog of profiles for matches with use cases, download the profiles, upload the profiles, and also compile profiles on demand.

To allow selection of the correct or most suitable profile for a use case, each profile will have numerous parameters describing its features, scaling factors, power draw under various conditions (if determinable), license fee, if applicable, etc. For example, profile X supports matching against 8,192 IPv4 entries, 4,096 IPv6 entries, both inner tunnel and outer tunnel addresses, 512 VLAN ranges, 1,024 layer 4 port entries, load balancing on inner and outer 5 tuples, etc. Such parameters may be stored for each profile in catalog 113 to allow rapid matching against use cases. In another example, as described above, the user may be presented with a graphical user interface, which, in one example, may be a shopping type interface for the user to select profiles directly.

To automatically match profiles with use cases, device configuration software 112 may analyze a prospective use case determine the minimum capabilities that it requires along with parameters associated with device 100 on which the profile will reside. For example, a user may have a prospective configuration for a network packet broker which will require a certain number of IP version 4 match entries in a layer 3 TCAM table, a certain number of MAC address entries in a layer 2 TCAM table, etc., or any number of so-called qualifiers, which are typically protocol header fields. Device configuration software 112 may analyze such parameters using an algorithm (linear searching, machine learning, etc.) and locate all profiles which meet minimum requirements of the use case and rank the profiles according to various metrics. Examples of such metrics may include how much headroom or waste the profile provides for each parameter, power draw, licensing fee, etc. The users or orchestration program can select the best profile according to the user's or orchestration program's policies (e.g., allocate headroom to allow more IPv4 entries in the future; minimum power; cheapest license). Device configuration software 112 may also rank profiles that almost match a given use case and give the user the ability to choose something that is less capable in one or more parameters, but with other benefits (availability cost, power, headroom in another parameter, etc.).

To retrieve profiles for loading and executing on device 100, if the number of permutations causes the superset of profiles to exceed the storage capabilities of device 100, a subset of profiles represented by catalog 113 along with a copy of catalog 113 may be stored on device file system 114 The subset of profiles may be chosen to address typical use cases. In addition, or alternatively, source code 104 and profile definitions 106 may be stored on device 100 for compiling on demand to produce profiles for executing on device 100 to implement typical use cases or custom use cases with parameter definitions specified by the device user. If storage space allows, more profiles can be downloaded onto the device from cloud storage device 116. If space on device 100 is limited, some profiles can be deleted from device 100 to make room for newer profiles. Any profiles stored on device 100 are available for immediate deployment/execution.

To provide for generation of plural profile configurations that are compatible with a device, programmable pipeline device source code programs 104 may be written in a parameterized way (e.g., using #defines and #ifdefs) to allow for variable scale factors and conditional inclusions of modules or code blocks. This makes the program composable/selectable based on initial compiler input parameters. Thus, by tabulating or generating parameters, a different effective program is realized. The parameters may be all or part of the catalog metadata used to describe a profile's capabilities and scaling factors.

Compiler 108 can be fed the same program with an exhaustive list of profile definitions (sets of parameters) and run to completion or failure (e.g., if it doesn't fit on the device). The list of parameters could be run to exercise various dimensions to determine their maximum viable ranges in combinations with all other parameters. Some tuning might be required to avoid searches that do not result in profiles that are viable for device 100. In one example, profile generation may be automated by a profile and catalog generator 120 that is implemented as a batch process that could be run on a cloud-based server farm or on one machine based on goals and objectives. Profile and catalog generator 120 may generate profiles for catalog 113 where the profiles are viable profiles that will execute on device 100. Profile catalog and generator 120 may also store the profile definitions and source code used to generate each profile. Profile and catalog generator 120 may also generate and store the metadata associated with each profile and create a catalog entry for each profile from the metadata. At least one processor 122 may be associated with profile and catalog generator 120 and device configuration software 112 to execute the functions performed by configuration software 112 and profile and catalog generator 120.

Alternatively, as described above, a user may create new profiles on-demand, modify existing profiles, and compile the profiles on device 100 using device configuration software 112. Device 100 may also include at least one processor 124, which may be implemented on the same chip or on a separate chip from programmable pipeline device 102. In one example, compiler 108 and device configuration software 112 may be implemented on processor 124 to create and compile profiles on-demand.

As indicated above, source code 104 may be stored on device 100 along with profile definitions 106 that enable users to create profiles on-demand on device 100. The following code example is P4 source code for generating two different profiles that vary according to MAC and IPv4 table size:

```
BEGINNING OF P4 SOURCE CODE EXAMPLE
//==================================================
PROFILE1 ==========================================
    #if (PROFILE == 1)
        #define PROFILE_DESCR "More MAC table entries, fewer IPv4 table entries"
        #define MAC_TABLE_SIZE 4096
        #define IPV4_TABLE_SIZE 1024
    //==================================================
PROFILE2 ==========================================
    #elif (PROFILE == 2)
        #define PROFILE_DESCR "Fewer MAC table entries, more IPv4 table entries"
        #define MAC_TABLE_SIZE 1024
        #define IPV4_TABLE_SIZE 4096
    #else
        #error (No recognized profile defined!)
    #endif
        action forward(PortId_t port) {
            ig_intr_tm_md.ucast_egress_port = port;
        }
        action drop( ) {
            ig_intr_dprsr_md.drop_ctl = 0x1; // Drop packet.
        }
        table ipv4_tbl {
```

```
        key = {
            hdr.ipv4.dst_addr : ternary;
            hdr.ipv4.src_addr : ternary;
        }
        actions = {
            drop;
            forward;
            @defaultonly NoAction;
        }
        size = IPV4_TABLE_SIZE; // size from profile
    }
    table mac_tbl {
        key = {
            hdr.ethernet.dst_addr : ternary;
            hdr.ethernet.src_addr : ternary;
        }
        actions = {
            drop;
            forward;
            @defaultonly NoAction;
            }
                size = MAC_TABLE_SIZE; // size from profile
    }
    apply {
        ipv4_tbl.apply( );
        mac_tbl.apply( );
    }
}
Pipeline(SwitchIngressParser( ),
        SwitchIngress( ),
        SwitchIngressDeparser( ),
        EmptyEgressParser( ),
        EmptyEgress( ),
        EmptyEgressDeparser( )) pipe;
    // The following annotations will add "profile" metadata to the
generated p4info:
    @pkginfo(name="Example acl program with profiles")
    @Profile_number(PROFILE)
    @Profile_description(PROFILE_DESCR)
    @Profile_param(mac_table_size=MAC_TABLE_SIZE)
    @Profile_param(ipv4_table_size=IPV4_TABLE_SIZE)
    Switch(pipe) main;
    END OF P4 SOURCE CODE EXAMPLE
```

The P4 source code above is input into compiler 108 with configuration parameters. The output of the compiler 108 is object code and a P4info file for each profile. The resulting annotations extracted from the p4info files are shown below. You can see how the profile parameters are stated above the tables, e.g.

```
#if (PROFILE == 1)
    #define PROFILE_DESCR "More MAC table entries, fewer IPv4
table entries"
    #define MAC_TABLE_SIZE 4096
    #define IPV4_TABLE_SIZE 1024
```

The size parameters are then used in the tables themselves:
  size=IPV4_TABLE_SIZE; // size from profile
The information specific to each profile is injected into the program's p4info file using annotations as follows:

```
    @pkginfo(name="Example acl program with profiles")
    @Profile_number(PROFILE)
    @Profile_description(PROFILE_DESCR)
    @Profile_param(mac_table_size=MAC_TABLE_SIZE)
    @Profile_param(ipv4_table_size=IPV4_TABLE_SIZE)
    @pkginfo(name="Example acl program with profiles")
    @Profile_number(PROFILE)
    @Profile_description(PROFILE_DESCR)
    @Profile_param(mac_table_size=MAC_TABLE_SIZE)
    @Profile_param(ipv4_table_size=IPV4_TABLE_SIZE)
```

The resulting p4info file is produced as one artifact of compiler 108. Here you see annotations. These can be parsed by a catalog access system, such as the configuration software illustrated in FIG. 1.

The annotation portion of the P4info file for Profiles #1 and #2 is as follows:

Example Annotations for Profile #1:

```
pkg_info {
    name: "Example acl program with profiles"
    annotations: "@Profile_number(1)"
    annotations: "@Profile_description(\"More MAC table entries, fewer IPv4 table entries\")"
    annotations: "@Profile_param(mac_table_size = 4096)"
    annotations: "@Profile_param(ipv4_table_size = 1024)"
}
```

Example Annotations for Profile #2:

```
pkg_info {
    name: "Example acl program with profiles"
    annotations: "@Profile_number(2)"
    annotations: "@Profile_description(\"Fewer MAC table entries, more IPv4 table entries\")"
    annotations: "@Profile_param(mac_table_size = 1024)"
    annotations: "@Profile_param(ipv4_table_size = 4096)"
}
```

In the annotation sections above, the annotation parameters contain metadata that describes the functionality of each profile. For example, the following annotations describe the functionality of Profile #1:

```
    annotations: "@Profile_number(1)"
    annotations: "@Profile_description(\"More MAC table entries, fewer IPv4 table entries\")"
    annotations: "@Profile_param(mac_table_size = 4096)"
    annotations: "@Profile_param(ipv4_table_size = 1024)"
```

It is the content of these annotation statements that may be extracted and stored in catalog 113 as metadata usable to match profiles with use cases. For example, if the user specifies MAC table size 4096 and IPv4 table size 1024, then the metadata for the Profile #1 would match this use case.

To determine whether a prospective new profile will be compatible with the existing use-case configuration, device configuration software 112 may analyze the existing configuration of device 100 to determine its "dimensions" (just like when a use case is analyzed to determine which profiles might work). This is then compared against the to-be-installed profile to see if the profile fits in terms of scale (e.g. number of filter rules) and features/capabilities (e.g. match criteria). If the existing configuration does not fit within the prospective profile, then the user can be presented with a report showing the violations. It may be possible to suggest how the configuration can be "pruned" to fit the prospective profile. The user could elect to perform the pruning, and device configuration software 112 will show the effect of the pruning (before executing the pruning).

Another possibility is for device configuration software 112 to suggest a different profile which is close to the one the user was going to use, but still fits the existing configuration. For example, suppose the user chose a profile which increases the number of IPv6 rules from 1024 to 2048. The profile correspondingly reduces the number of IPv4 rules from 4096 to 2048 (due to fixed flexible resources, e.g.

TCAM tiles). If the current number of IPv4 rules is 3000, such a configuration will not work with the new profile. However, there might be an alternative profile which supports 1536 IPv6 rules and 3192 IPv4 rules. Device configuration software 112 may suggest the alternative profile as a compromise and it might satisfy the new use-cases (since the user knows they don't really need 2048 IPv6 rules, just 1200).

To allow a user to create a new profile, the user can submit a prospective device configuration or a prospective profile definition (set of parameters) to device configuration software 112, and device configuration software 112 may attempt to build the profile. For example, there might be a combination of scaling factors and capabilities which the user wants but was never generated for some reason (didn't seem useful, overlooked, or there was no prior market demand). The user may submit the combination of scaling factors and capabilities for the profile to device configuration software 112. Device configuration software 112 may analyze the scaling factors and capabilities, extract use case parameters, and use the use case parameters to build a compatible profile on device 100.

Figure 2A:
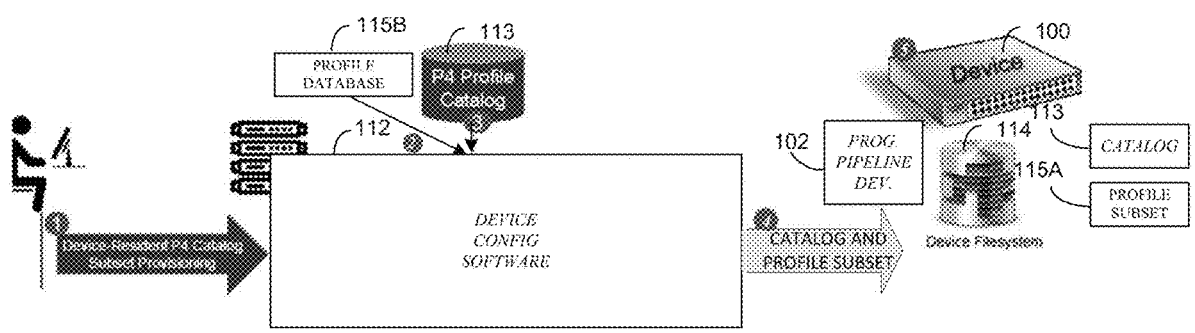
FIG. 2A is a block diagram illustrating an on-line provisioning phase of a programmable pipeline device.

FIG. 2A illustrates an online provisioning phase where device configuration software 112 receives input from a user and provisions a subset of profiles on device 100. Referring to FIG. 2A, in step 1, a user instructs device configuration software 112 to download a subset of profiles, source code, profile parameter definitions, and profile metadata from database 115B to profile subset 115A and a copy of catalog 113 for provisioning on device 100. In steps 2-5, the subset of profiles from profile database 115B and a copy of catalog 113 are downloaded and loaded onto device 100 via device configuration software 112. After downloading, device file system 114 includes profile subset 115A and a copy of catalog 113. Profile subset 115A may include a set of compiled profile images representing typical use cases of device 100, source code for generating profiles, and profile parameter definitions for serving as compiler input along with the source code to generate profiles for typical or user-customized use cases.

Figure 2B:
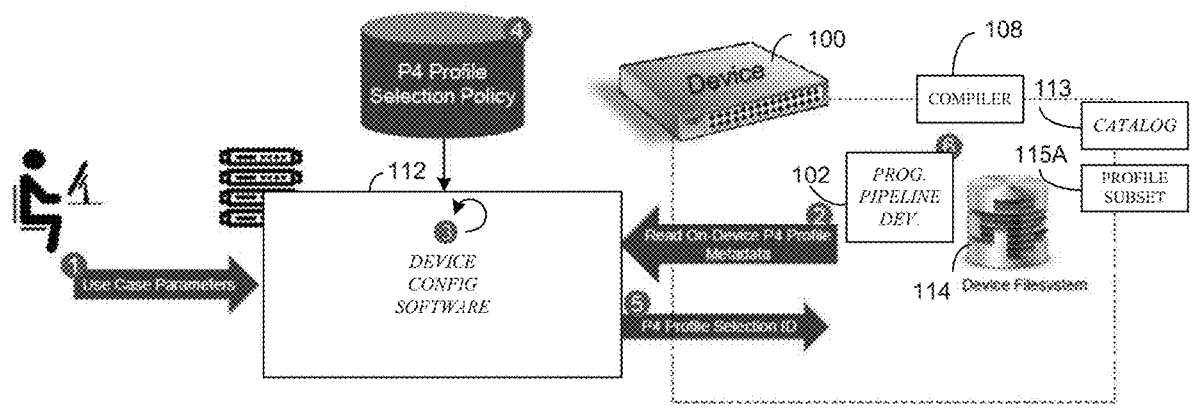
FIG. 2B is a block diagram illustrating an off-line device configuration phase of a programmable pipeline device.

FIG. 2B illustrates the automatic selection and on-demand, on-device compiling of a profile based on use case parameters input by the user. Referring to FIG. 2B, in step 1, a user inputs use case parameters to device configuration software 112. In step 2, device configuration software 112 reads metadata associated with the profile stored on device 100. In step 3, profile selection logic of device configuration software 112 selects, from the profiles resident on device 100, profiles that match the use case input by the user. In step 4, from the profiles that match the use case, the profile selection logic uses the profile selection policies to determine which of the profiles best matches the user's requirements. For example, the profile selection policies may include policies that rank profiles based on minimizing head room or waste, minimizing license fees, or other suitable criteria. In step 5, profile selection logic of device configuration software 112 selects the profile that best matches the policy and communicates an identifier for the selected profile to device 100. In step 6, assuming the matching profile is not already compiled, device 100 selects the source code and parameter inputs that match the uses case, invokes compiler 108 to compile the profile on demand, and loads the profile onto programmable pipeline device 102 to configure programmable pipeline device 102 to implement the network test or visibility function that matches the use case.

Figure 3:
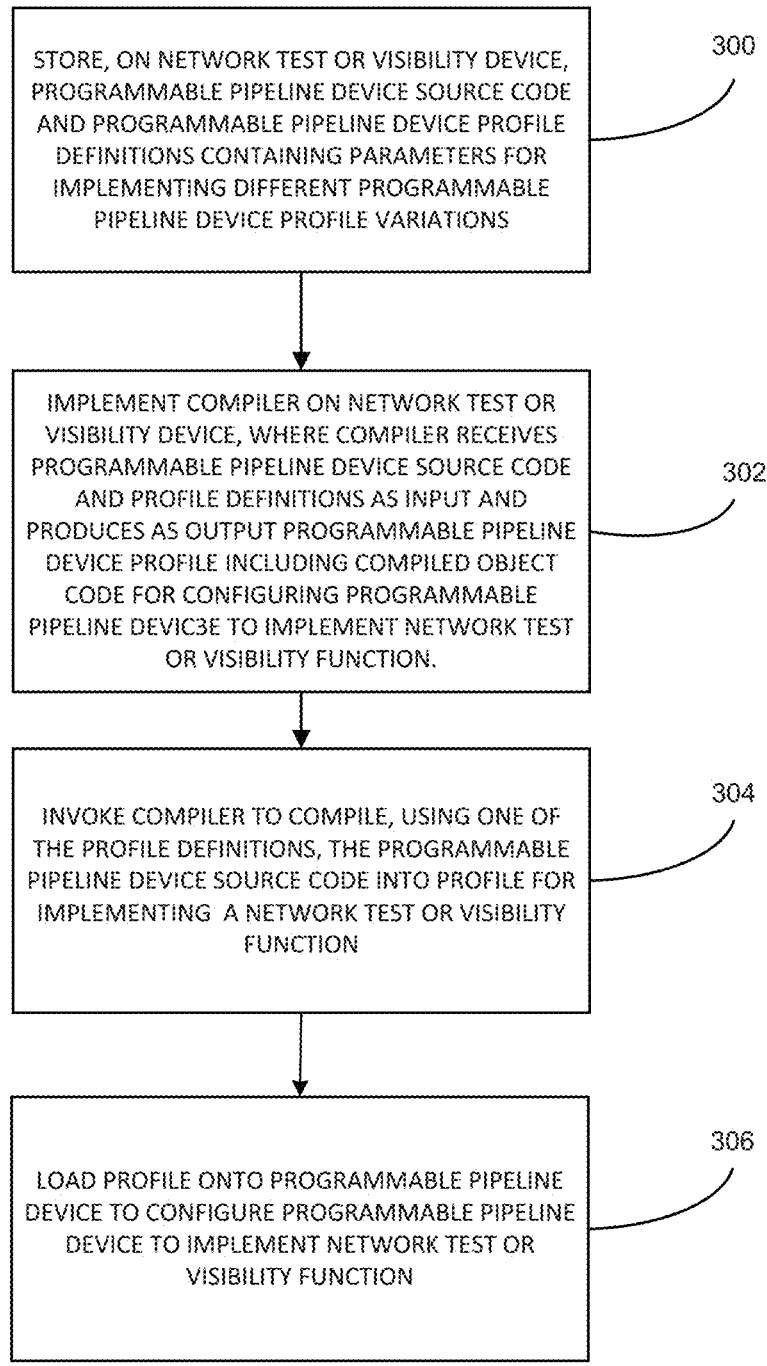
FIG. 3 is a flow chart illustrating an exemplary process for on-demand, on-device compiling and use of programmable pipeline device profiles.

FIG. 3 is a flow chart illustrating an exemplary process for storage, retrieval, and use of programmable pipeline device profiles. Referring to FIG. 3, in step 300, the process includes storing, on a network test or visibility device, programmable pipeline device source code and a plurality of different programmable pipeline device profile definitions containing parameters for implementing different programmable pipeline device profile variations. For example, device 100, which in one example may be a network packet broker, may store source code, such as P4 source code, and profile definitions, such as IP lookup table configurations, packet filter rules, etc.

In step 302, the process includes implementing, on the network test or visibility device, a compiler that receives the programmable pipeline device source code and one of the profile definitions as input and that produces as output a programmable pipeline device profile including compiled object code for configuring a programmable pipeline device to implement a network test or network visibility function. In one example, the compiler may be a P4 compiler for compiling P4 source code and parameter definitions into P4 object code for configuring a P4 device.

In step 304, the process includes invoking the compiler to compile, using one of the profile definitions, the programmable pipeline device source code into a programmable pipeline device profile for implementing a network test or visibility function. For example, the network test or visibility device configuration software may enable the user to invoke the compiler on the network test or visibility device to compile source code on the device into object code for implementing the desired network test or visibility function.

In step 306, the process includes loading the profile on the network test or visibility device to configure the programmable pipeline device for implementing the network test or network visibility function. For example, once a profile is compiled, it may be loaded onto the programmable pipeline device to configure the programmable pipeline device. Examples of network test or visibility device functions may include implementing layer 2 or layer 3 lookup tables to match entries with parameters in received packets. If device 100 is a network packet broker, the layer 2 or layer 3 lookup tables may be associated with a packet filter that filters incoming packets and delivers the filtered packets to a network tool. Other examples of network visibility functions that may be implemented using a profile include, but are not limited to, packet deduplication, load balancing, packet header stripping, general routing encapsulation (GRE) tunneling, data masking, deep packet inspection, application identification, packet capture, packet timestamping, passive secure sockets layer (SSL) decryption, active SSL gateway services, network security services, network threat detection services, network threat mitigation services, network flow record creation, network flow statistics generation/reporting, general packet radio service (GPRS) tunneling protocol (GTP) and session initiation protocol (SIP) correlation, GTP and SIP load balancing, mobile subscriber filtering, mobile subscriber sampling, mobile subscriber whitelisting, and packet core filtering.

Thus, the subject matter described herein includes a network test or visibility device with an on-board compiler capable of compiling programmable pipeline device source code on demand. The catalog and the "master" source program or programs are small compared to the compiled output. Once a profile is selected it can be compiled locally, with a compile time on the order of minutes. The compiled profile should fit on the network or visibility device because the catalog from which the source code and parameters are selected may, in one example, contain source code and parameters associated with pre-vetted profiles. This could resolve an issue where devices are not connected to the Internet for security reasons.

In one example, a network device that operates/is configured based on a programmable dataplane (e.g., a network switch, a network monitoring device, a network security device, a network test device, etc.) may include a functional programmable dataplane language compiler, such as a P4 compiler. In various contemplated implementations, the present on-device P4 compiler may be implemented on or in conjunction with a P4 application specific integrated circuit (ASIC), a central processing unit (CPU), a graphics processing unit (GPU), a system on a chip (SoC), and other field programmable gate array (FPGA) devices. A programmable dataplane network device may include some or all of the components listed above. In one example, the P4 compiler functionality is implemented in hardware/firmware on a P4 ASIC chip (e.g., Tofino ASIC, etc.) that comprises or resides onboard a network device. In another example, the P4 compiler functionality is implemented in hardware/firmware/software on a CPU/GPU/SoC chip that is co-resident in a network device along with a P4 ASIC chip (e.g., Tofino ASIC, etc.). In yet another example, the P4 compiler functionality is implemented in hardware/firmware/software on a hybrid chip that includes both CPU/GPU/SoC and P4 ASIC components.

In some implementations of the subject matter described herein, an on-device P4 compiler may include the ability to pre-process P4 source code files, which include embedded external parameter references. Each P4 source code file is written in a parameterized way (e.g. using #defines and #ifdefs) to allow for variable scale factors and conditional inclusion of modules or code blocks. This makes each P4 source code program composable/scalable based on variation in these input parameters at the time of compilation. Parameter definitions are stored in one or more profile definition files, which may also include other profile metadata. This pre-processing system produces a fully-resolved P4 source code file (i.e., input parameter values have been inserted in place of variable references) that is subsequently processed by the P4 compiler and compiled so as to produce a compiled image for a specified target device. As defined herein, each resulting fully resolved P4 source code file represents a unique P4 profile.

A catalog listing of P4 source code, profile definitions, and compiled P4 profiles may be stored in an on-device repository and is available to allow the user to select source code and profile definitions to be compiled and used to configure the P4 device. The catalog may also allow the user to select compiled P4 profiles used to configure the P4 device.

In one example, only source code and profile definition files associated with P4 profiles that are known to fit the target device (through previous testing) are downloaded to and stored in the target device's P4 profile repository. As such, a system user can examine a manifest of the contents of a target device's catalog/repository and select a P4 profile for deployment.

Once selected, the source code and profile definition files associated with that P4 profile are extracted from the repository and these files are pre-processed and compiled by the on-device P4 compiler to produce a deployable P4 image file and associated compiler objects/artifacts and metadata. The deployable P4 image is then loaded onto the programmable pipeline device.

In an alternate example, a set of source files is downloaded to and stored in the target device's P4 profile repository. At runtime, a system user can examine the catalog and select a particular P4 source file for deployment. The on-device P4 compiler then examines the selected P4 source file and identifies all of the parameters within the source file that need to be explicitly specified directly or indirectly by the user. The user is then prompted to specify the required parameter values manually. It will be appreciated that in some cases, the user may indirectly provide the required parameter information by specifying abstract configuration information, which is subsequently translated into the required parameter values during the pre-processing stage. In this case, as the source code for each P4 profile is pre-processed and compiled, the system may monitor status and alert notifications that are generated by the compiler during the compilation process (e.g., compiler success/failure notifications, warnings, etc.).

In the event that the selected combination of P4 source and parameters (i.e., the selected P4 profile) does not fit the target device, the system alerts the user that changes must be made to either the selected P4 source or the associated parameter values. In the case of such a compilation failure, the system described herein may implement a configuration assistance engine that is adapted to use various technologies (e.g., AI, heuristics, expert systems, etc.) to generate/suggest different parameter values to the user.

It will be appreciated that the methods and systems described herein make it possible for a user to dynamically reconfigure the P4 target device without requiring that the device be connected to external provisioning resources (e.g., cloud-based P4 compiler and source code repository).

In use case scenarios where the target device is being operated in an isolated/off-line mode, the subject matter described herein provides an added degree of usage/configuration flexibility. Also, in scenarios where the post-compilation files/objects are larger in size than the associated source code and profile definitions, the methods and systems described herein provide for more efficient use of on-device storage.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for on-demand, on-device compiling and use of programmable pipeline device profiles, the method comprising:
    storing, on a network test or network visibility device, programmable pipeline device source code and a plurality of different programmable pipeline device profile definitions containing parameters for implementing different programmable pipeline device profile variations;
    implementing, on the network test or network visibility device, a compiler that receives the programmable pipeline device source code and one of the profile definitions as input and that produces as output a programmable pipeline device profile including compiled object code for configuring a programmable pipeline device to implement a network test or network visibility function;
    invoking the compiler to compile, using one of the profile definitions, the programmable pipeline device source code into a programmable pipeline device profile for implementing a network test or network visibility function;

loading the profile on the network test or network visibility device to configure the programmable pipeline device for implementing the network test or network visibility function; and downloading a catalog onto the network test or network visibility device, where the catalog describes profiles for configuring the programmable pipeline device, receiving, via the catalog, selection of one of the profiles, and wherein invoking the compiler includes invoking the compiler using programmable pipeline device source code and a profile definition corresponding to the profile selected via the catalog.

2. The method of claim 1 wherein storing the programmable pipeline device source code and the different programmable pipeline device profiles on the network test or network visibility device includes storing the programmable pipeline device source code and the profile definitions in a file system of the network test or network visibility device.

3. The method of claim 1 wherein implementing the compiler on the network test or network visibility device includes implementing the compiler on the programmable pipeline device.

4. The method of claim 1 wherein implementing the compiler on the network test or network visibility device includes implementing the compiler on a processor separate from the programmable pipeline device.

5. The method of claim 1 wherein implementing the compiler on the network test or network visibility device on a chip that includes the programmable pipeline device and at least one additional processor.

6. The method of claim 1 comprising providing device configuration software for enabling creation of new programmable pipeline device profile source code and profile definitions to be stored on the network test or network visibility device and modification of existing programmable pipeline device profile source code and profile definitions stored on the network test or network visibility device.

7. The method of claim 6 comprising receiving input via the device configuration software to create or modify the programmable pipeline device profile source code or to create or modify one of the profile definitions and wherein invoking the compiler includes invoking the compiler using the input received via the device configuration software.

8. The method of claim 1 comprising determining, by the compiler, that the programmable pipeline device source code and profile definition received as input will result in a compiled profile that will not fit on the network test or network visibility device, generating output indicative of a compilation failure, and requesting changes to the programmable pipeline device source code or parameter definition received as input.

9. The method of claim 1 wherein the programmable pipeline device comprises a P4 device, the programmable pipeline device source code comprises P4 source code, and the compiler comprises a P4 compiler.

10. A system for on-demand, on-device compiling and use of programmable pipeline device profiles, the system comprising:
a network test or network visibility device;
a programmable pipeline device implemented on the network test or network visibility device;
a programmable pipeline device source code compiler implemented on the network test or network visibility device;
wherein the network test or network visibility device stores programmable pipeline device source code and a plurality of different programmable pipeline device profile definitions containing parameters for implementing different programmable pipeline device profile variations;
wherein the compiler receives the programmable pipeline device source code and one of the profile definitions as input and produces as output a programmable pipeline device profile including compiled object code for configuring the programmable pipeline device to implement a network test or network visibility function; and
device configuration software for invoking the compiler to compile, using one of the profile definitions, the programmable pipeline device source code into a programmable pipeline device profile to implement a network test or network visibility function and loading the profile onto the programmable pipeline device to configure the programmable pipeline device for implementing the network test or network visibility function, wherein the device configuration software downloads a catalog onto the network test or network visibility device, where the catalog describes profiles for configuring the programmable pipeline device, receiving, via the catalog, selection of one of the profiles, and wherein the device configuration software invokes the compiler using programmable pipeline device source code and a profile definition corresponding to the profile selected via the catalog.

11. The system of claim 10 wherein network test or network visibility device includes a file system and the programmable pipeline device source code and the profile definitions are stored in the file system.

12. The system of claim 10 wherein the compiler is implemented on the programmable pipeline device.

13. The system of claim 10 wherein the network test or network visibility device includes at least one processor separate from the programmable pipeline device and wherein the compiler is implemented on the at least one processor.

14. The system of claim 10 wherein the network test or network visibility device includes a chip that that includes the programmable pipeline device and at least one processor and the compiler is implemented on the chip.

15. The system of claim 10 wherein the device configuration software enables creation of new programmable pipeline device profile source code and profile definitions to be stored on the network test or network visibility device and modification of existing programmable pipeline device profile source code and profile definitions stored on the network test or network visibility device.

16. The system of claim 10 wherein the device configuration software downloads a catalog onto the network test or network visibility device, where the catalog describes profiles for configuring the programmable pipeline device, receiving, via the catalog, selection of one of the profiles, and wherein the device configuration software invokes the compiler using programmable pipeline device source code and a profile definition corresponding to the profile selected via the catalog.

17. The system of claim 10 wherein the compiler determines that the programmable pipeline device source code and profile definition received as input will result in a compiled profile that will not fit on the network test or network visibility device, generating output indicative of a compilation failure, and requesting changes to the programmable pipeline device source code or parameter definition received as input.

18. The system of claim 10 wherein the programmable pipeline device comprises a P4 device, the programmable pipeline device source code comprises P4 source code, and the compiler comprises a P4 compiler.

19. A non-transitory computer readable medium having stored thereon executable instructions that when executed by a processor of a computer control the computer to perform steps comprising:

storing, on a network test or network visibility device, programmable pipeline device source code and a plurality of different programmable pipeline device profile definitions containing parameters for implementing different programmable pipeline device profile variations;

implementing, on the network test or network visibility device, a compiler that receives the programmable pipeline device source code and one of the profile definitions as input and that produces as output a programmable pipeline device profile including compiled object code for configuring a programmable pipeline device to implement a network test or network visibility function;

invoking the compiler to compile, using one of the profile definitions, the programmable pipeline device source code into a programmable pipeline device profile for implementing a network test or network visibility function;

loading the profile on the network test or network visibility device to configure the programmable pipeline device for implementing the network test or network visibility function; and downloading a catalog onto the network test or network visibility device, where the catalog describes profiles for configuring the programmable pipeline device, receiving, via the catalog, selection of one of the profiles, and wherein invoking the compiler includes invoking the compiler using programmable pipeline device source code and a profile definition corresponding to the profile selected via the catalog.

* * * * *